Aug. 8, 1961 R. D. SNYDER 2,995,391
SEALS AND IMPROVED SHELLS THEREFOR
Filed Oct. 11, 1957 4 Sheets-Sheet 1
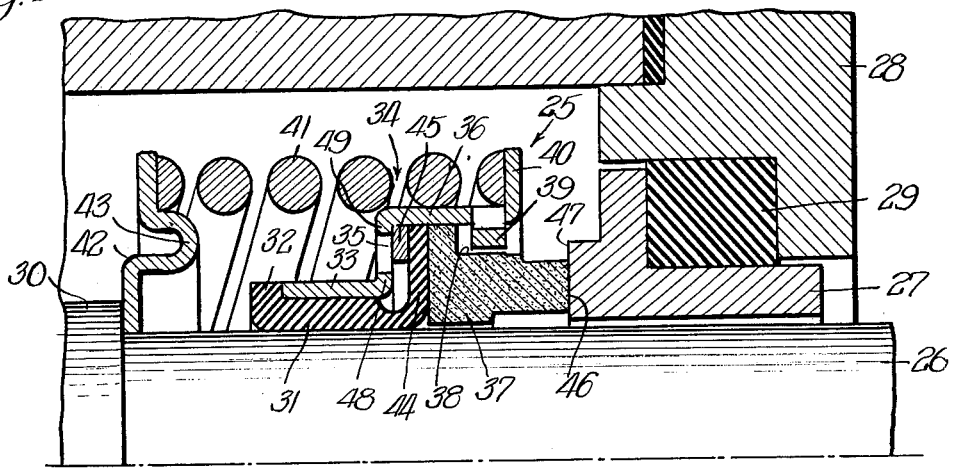
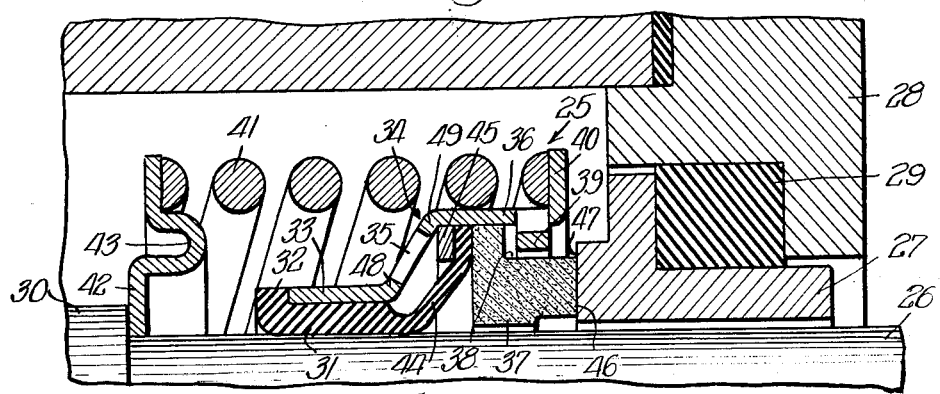
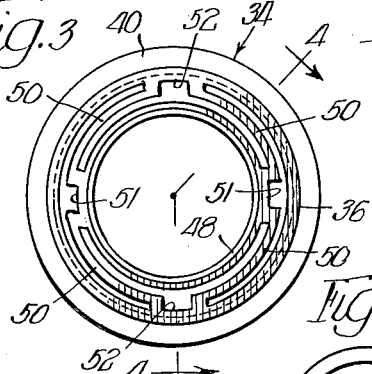
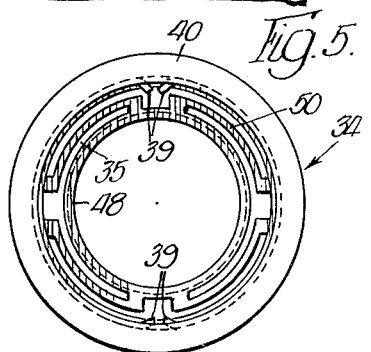
INVENTOR.
Russel D. Snyder,
BY
Cromwell, Greist & Warden
Attys.

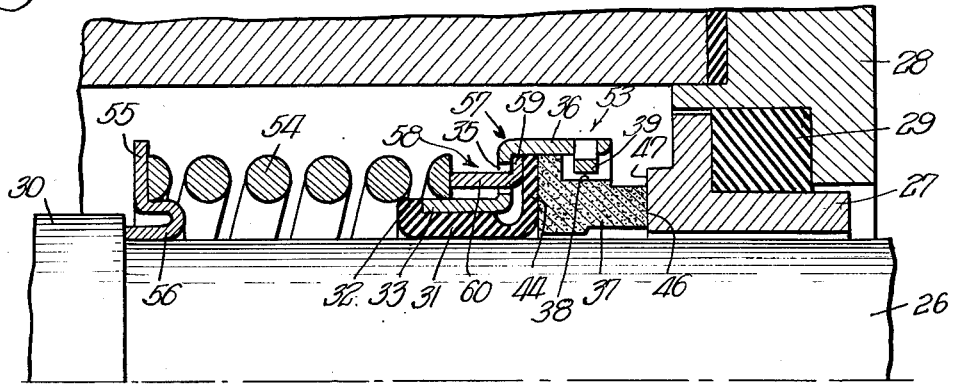
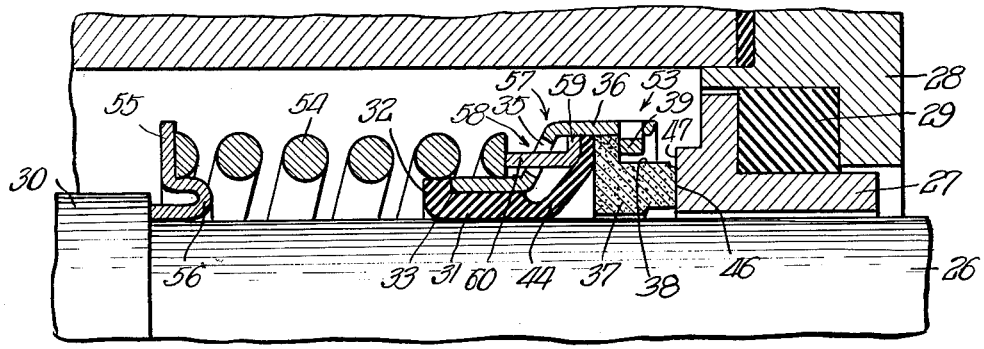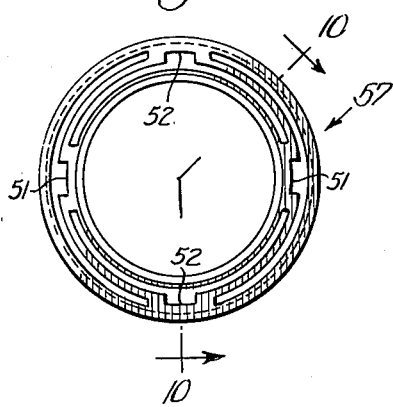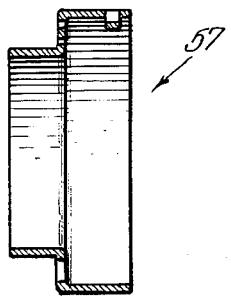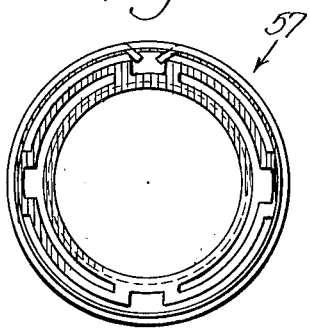

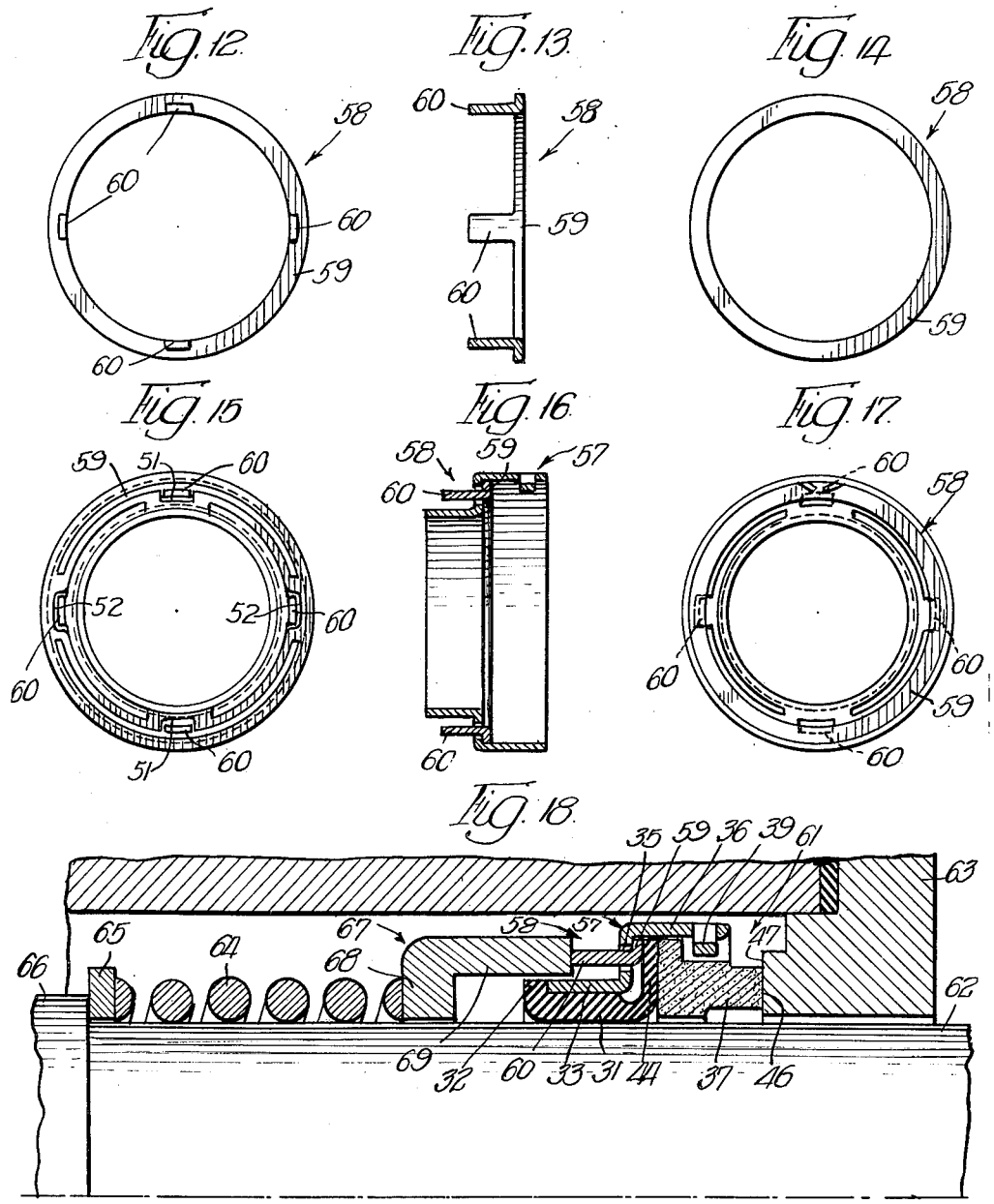

Aug. 8, 1961   R. D. SNYDER   2,995,391
SEALS AND IMPROVED SHELLS THEREFOR
Filed Oct. 11, 1957   4 Sheets-Sheet 4
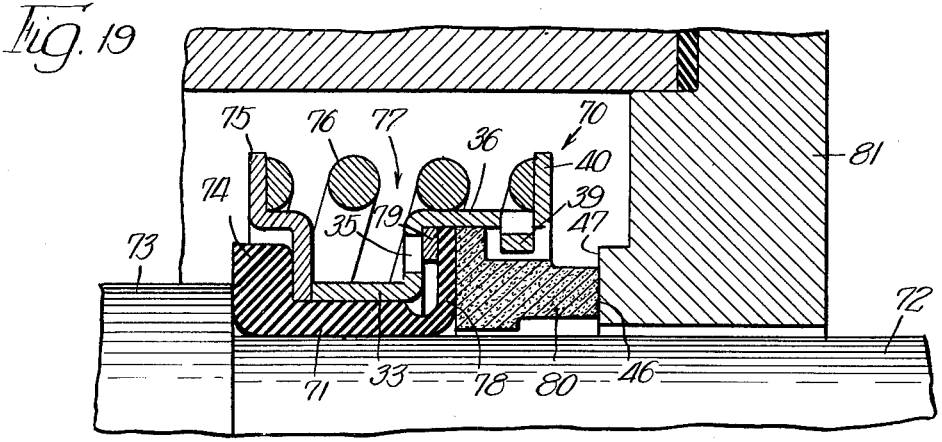
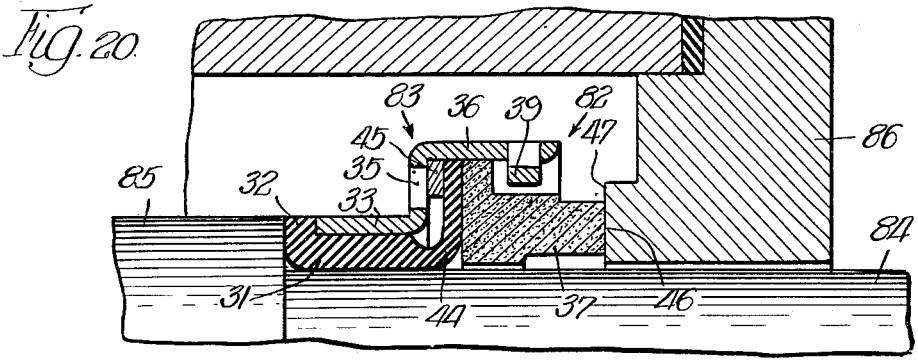
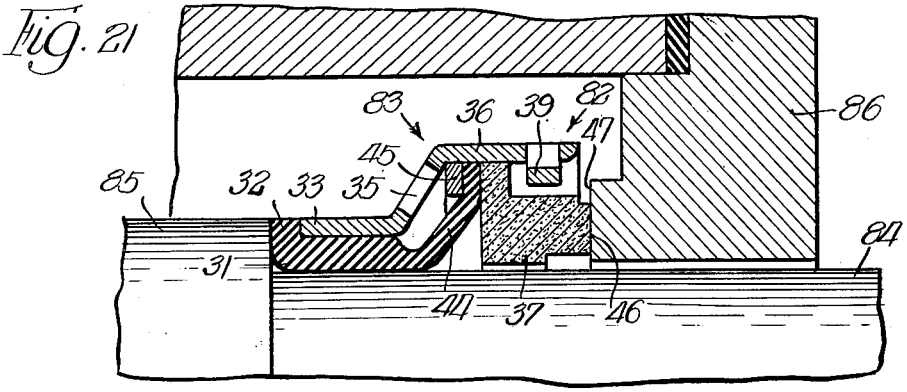
INVENTOR.
Russel D. Snyder,
BY
Cromwell, Greist + Warden

United States Patent Office 2,995,391
Patented Aug. 8, 1961

2,995,391
SEALS AND IMPROVED SHELLS THEREFOR
Russel D. Snyder, Chicago, Ill., assignor to Chicago Rawhide Manufacturing Company, Chicago, Ill., a corporation of Illinois
Filed Oct. 11, 1957, Ser. No. 689,618
8 Claims. (Cl. 286—11.15)

The present invention relates to seals of the type particularly adapted for mounting on a shaft in sealed relation therewith while being further designed for end face sealing engagement with a part associated with the shaft, the part or the shaft being mounted for rotation relative to the other. More specifically, the present invention is directed to a new and improved shell member of one-piece design particularly adapted for use in a rotary-type seal wherein axial expansion or contraction of a sealing member forming a part thereof is essential to efficient operation of the seal.

Known types of seals designed for mounting on a rotatable shaft for sealing engagement therewith and for end face sealing engagement with a stationary bearing plate or housing portion receiving the shaft are provided with means whereby the sealing nose portion in end face sealing engagement with the bearing plate or shaft housing can move axially along the shaft to compensate for nose wear while the overall seal maintains efficient sealing action between the shaft and the bearing plate or housing. In this particular type of seal a resilient body portion is provided for mounting in tight, fixed sealing relation on the shaft and the sealing nose portion is generally a separate member formed from resistant material such as carbon or carbon-containing compositions. The end face sealing member is mounted about the shaft in spaced relation thereto for axial movement therealong in a direction away from the body portion and towards the radial sealing face of the bearing plate or housing with which the sealing action is established to compensate for wear at the radial sealing face. To complete a seal of this type, the resilient material of the body portion is generally provided with a flexible lip-like diaphragm which along its free margin is suitably attached to the adjacent face of the end face sealing member to maintain a complete seal during axial movement of the sealing member along the shaft away from the body portion. In maintaining an assembly of this nature it has been the practice to utilize rather complicated casing structures which hold the separate portions of the seal in operative engagement while allowing axial expansion of the same. To accomplish this necessary function a plurality of separate shells or casing members are mounted in rotationally interlocked relation for torque transmitting purposes while being relatively movable to one another in an axial direction to allow proper expansion functioning of the seal.

With the use of a plurality of separate metal elements to make up a suitable shell or casing member for a seal of the type described, installation and operational problems result. Considerable care must be taken during installation to properly interlock the separate casing members for torque transmitting purposes while retaining freedom of movement between the same in an axial direction. During operation the interlocking elements of the casing member made up from separate elements are subject to excessive wear by reason of the presence of sliding surfaces and further due to the presence of wind-up between the separate elements upon initiation of torque transmission. Care must be taken to design the interlocking fingers with tolerances capable of minimizing shock or other damage due to the presence of excessive wind-up while at the same time allowing free axial relative movement for seal expansion purposes. It will be appreciated that optimum conditions are difficult to obtain. If, for example, greater tolerances were to be used to establish conditions favoring axial relative movement between the separate casing member elements, the damaging wind-up upon initiation of torque transmission is substantially increased. Conversely, minimizing torque initiation wind-up results in increasing frictional resistance and wear with respect to axial relative movement.

It is an object of the present invention to provide a new and improved seal of the type wherein a fixed portion is operatively associated with an axially movable portion for end face sealing engagement with a part mounted relative to another part on which the seal is mounted, the operative association of the separate portions of the seal being maintained by a one-piece shell member which in and of itself forms a part of the present invention and which further is designed for resilient flexure to allow axial movement of the end face sealing portion relative to the fixed portion of the seal.

Another object is to provide various forms of fluid seals which make use of a new and improved one-piece shell member in operatively interconnecting separate parts thereof while allowing relative axial movement between said parts, the shell member being designed for efficient single-element torque transmission between the parts of the seal while further being resiliently expandable without interruption in efficient torque transmission during axial expansion of the parts of the seal, the use of the one-piece shell member resulting in efficient operation of the seal without accompanying frictional wear or wind-up upon initiation of torque transmission.

Other objects not specifically set forth will become apparent from the following detailed description made in conjunction with the drawings wherein:

FIG. 1 is a fragmentary vertical section in elevation of one form of improved seal of the present invention;

FIG. 2 is a view similar to FIG. 1 illustrating operative functioning of the seal thereof;

FIG. 3 is a rear end face elevation on reduced scale of the improved shell member forming a part of the present invention and illustrated in operative use in FIGS. 1 and 2;

FIG. 4 is a sectional view of the shell member of FIG. 3 taken generally along line 4—4 therein;

FIG. 5 is an opposite end face elevation of the shell member;

FIG. 6 is an elevation in reduced scale of a washer element used in the seal assembly of FIGS. 1 and 2;

FIG. 7 is a fragmentary vertical section of another form of improved seal illustrating the same mounted in its operative position;

FIG. 8 is a view similar to FIG. 7 illustrating operational use of the seal thereof;

FIG. 9 is a rear end face elevation on reduced scale of a slightly modified form of shell member used in the seal of FIGS. 7 and 8;

FIG. 10 is a sectional view of the shell member of FIG. 9 taken generally along line 10—10 therein;

FIG. 11 is a front end face view of the shell member of FIG. 10;

FIG. 12 is a front face elevation on reduced scale of a ring element forming a part of the seal of FIGS. 7 and 8;

FIG. 13 is a vertical section of the ring element of FIG. 12;

FIG. 14 is a rear face elevation of the ring element of FIG. 12;

FIG. 15 is a front end face elevation of the assembled shell member of FIG. 9 and ring element of FIG. 12;

FIG. 16 is a vertical section of the assembly of FIG. 15;

FIG. 17 is a rear end face elevation of the assembly of FIG. 15;

FIG. 18 is a fragmentary vertical section of still a further modified form of seal incorporating the principles of the present invention;

FIG. 19 illustrates a fragmentary vertical section of a further modified form of seal;

FIG. 20 illustrates a fragmentary vertical section of still a further modified form of seal; and FIG. 21 illustrates operational use of the seal of FIG. 20.

As shown in FIGS. 1 and 2, a seal 25 incorporating the principles of the present invention is installed in a typical environment including a rotatable shaft 26 having received thereabout in close association a mating ring or floating seat 27 carried in a shaft housing 28 and resiliently mounted therein by means of a rubber ring 29. The shaft 26 in spaced relation to the mating ring 27 is provided with an enlarged collar-like portion 30 which with the mating ring 27 defines the area in which the seal 25 is received. This type of installation is typical of a pump installation wherein the shaft 26 drives the pump impeller.

The seal 25 includes a resilient body portion 31 which is in the form of annular rubber sleeve expanded to be received in fixed relation about the shaft 26. The outer surface of the body portion 31 is provided with a rearwardly positioned, circumferentially continuous rib 32 against which is received the rear radial face of an axially extending sleeve portion 33 of a casing or shell member generally designated by the numeral 34. The sleeve 33 is suitably fixed to the outer surface of the body portion 31 such as by force fitting or cementing to prevent relative movement between the shell member 34 and the body portion 31.

The forward edge of the sleeve 33 has integrally joined therewith a radially outwardly directed portion 35, the structural features of which will subsequently be described. The outermost edge of the radially directed portion 35 has integrally joined therewith a forwardly and axially extending sleeve 36 which is received about and substantially overlaps a sealing nose portion 37 mounted about the shaft 26 in spaced relation thereto. The outer surface of the sealing nose portion 37 is provided with at least one axially extending groove 38 of known arrangement into which is received a locking lug 39 stamped or cut from the material of the sleeve 36 to lock the sealing nose portion 37 for rotation with the shell member 34, body portion 31, and shaft 26.

Forwardly of the inwardly depressed locking lugs 39, the sleeve 36 is provided with an integral radially outwardly projecting rim 40 against which the forward end of a coil spring 41 is seated. The rearmost end of the coil spring 41 is seated against a collar 42 which is suitably fixed to the shaft 26 in abutment with the enlarged portion 30. The spring seat 42 includes an annular rim-like, reversely folded portion 43 to reinforce the outer marginal portion of the same to hold the spring in compressed condition.

The forward edge of the resilient body portion 31 has integrally formed therewith a circumferentially continuous web or diaphragm 44, the free marginal portion of which is tightly held or clamped against the rearmost radial face of the nose portion 37 by a washer or ring 45 received within the shell member 34 and tightly clamped therein by the radially directed portion 35 thereof. The nose portion 37 is mounted within the shell member 34 for axial movement relative thereto while being restrained from rotational relative movement by the depressed locking lugs 39 as previously described. Upon installation as illustrated in FIG. 1, the forward radial end face 46 of the nose portion 37 projecting outwardly of the shell member 34 is tightly received against the radial sealing face 47 of the mating ring 27. The body portion 31 is fixedly received about the shaft 26 relative to the mating ring 27 to tightly clamp the nose portion 37 therebetween and compress and hold the outer marginal portion of the diaphragm 44 between the nose portion 37 and the washer 45 within the shell member 34. The spring 41 functions to maintain this relationship during operation of the seal.

Upon operation of the seal 25 in the environment illustrated, rotation of the shaft 26 results in rotation of the entire seal structure relative to the mating ring 27. A tight seal is maintained by the body portion 31 with the shaft 26 and a running or rotary end face sealing action is established between the surfaces 46 and 47 of the nose portion 37 and mating ring 27, respectively. The shell member 34 rotates with the body portion 31 by reason of the engagement between the sleeve 33 and the body portion 31 and torque is transmitted through the radially directed portion 35, sleeve 36 and lugs 39 of the shell member 34 to the nose portion 37 to rotate the same with the shaft 26. The maintaining of compression at both ends of the nose portion 37 between the mating ring 27 and the radially directed portion 35 of the shell member 34 holds the free margin of the diaphragm 44 and washer 45 in tight engagement to maintain complete sealing action.

With continued operation of the seal 25, the protruding sealing nose of the nose portion 37 becomes worn to the extent shown in FIG. 2. During the wearing down of nose area it is essential that the seal 25 expand in an axial direction to maintain proper sealing action between the shaft 26 and mating ring 27. The radially directed portion 35 is so constructed as to be capable of flexing in an axial direction to allow forward movement of the sleeve 36 away from the sleeve 33. The forward flexing of the portion 35 occurs in response to the urging of the spring 41 and the diaphragm 44 is moved forwardly and eventually stretched to maintain a complete seal. As shown in FIG. 2, a tight sealing engagement is maintained between the rear radial face of the nose portion 37, the outer marginal area of the diaphragm 44 and the washer 45 upon axial expansion of the seal 25. During axial expansion of the seal and forward flexing of the radially extending portion 35 of the shell member 34, complete torque transmission is maintained by the shell member 34 through the portion 35 thereof.

Seal expansion and torque transmission is established and maintained by reason of the new and improved design of the shell member 34, the details of which are shown in FIGS. 3–5. The radially directed portion 35 as particularly shown in FIGS. 3 and 5 is provided with a plurality of annular slot-like openings in the form of circumferentially overlapping and non-continuous arcuate slots which are defined by an inner radially directed continuous ring area 48, an outer radially directed continuous ring area 49 and intermediate segmental flexible bands 50. Each of the bands 50 at one end is integrally attached to the inner ring 48 and at the other end integrally attached to the outer ring 49. In this manner a resilient web-like arrangement is provided which is capable in a radially circumferentially direction of efficiently transmitting torque between the peripheral rings 48 and 49 while further allowing axial relative movement therebetween without loss in efficiency of torque transmission. The connection of the bands 50 to the inner ring 48 defines a pair of oppositely positioned grooves 51 for a purpose to be described in connection with the modifications of FIGS. 7–8 and FIG. 18 while the connection of the bands 50 to the outer ring 49 defines a pair of oppositely positioned grooves 52 which are alternately spaced relative to the grooves 51 in a circumferential sense. By reason of the manner in which the bands interconnect the rings 48 and 49, the grooves 51 open radially outwardly whereas the grooves 52 open radially inwardly. Upon use of the shell member 34 in forming the seal 25, the outer radially directed ring 49 overlaps the outer periphery of the washer 45 to retain the same in tightly clamped engagement with the outer margin of the diaphragm 44. The washer 45 as shown in FIG. 6 is of standard design being merely a ring-type member provided with flat sides.

FIGS. 7 and 8 illustrate a modified form of seal which utilizes a different diaphragm clamping arrangement which additionally serves as the forward seat of the coil spring. Elements of the seal 53 of FIGS. 7 and 8 which are identical in structure and arrangement to those previously described in connection with the seal 25 are identified by the same reference numbers. In the mounted condition of the seal 53 as shown in FIG. 7, a coil spring 54 is seated at the rearmost end thereof on an annular collar 55 received about the shaft 26 in fixed abutment with the enlarged portion 30. The collar 55 is provided with a reversely folded portion 56 for strengthening purposes and the spring seat portion thereof is located in closer proximity to the shaft 26 as compared with the collar 42 of the seal 25. With this arrangement the diameter of the spring 54 is reduced to an extent that the total outside diameter of the seal 53 is less than that of the seal 25 adapting the same for use in installations of limited sealing mounting area.

The seal 53 includes a body portion 31, diaphragm 44 and nose portion 37 of the type previously described, all of which are mounted in operative relation to provide the sealing function set forth above. The shell member 57 is used to interconnect the body portion 31 and nose portion 37 and includes substantially the same structural features as that described in connection with the shell member 34. The only variation in the shell member 57 resides in the elimination of the forwardly positioned, radially outwardly directed rim 40 which in the seal 25 provides the forward seat for the spring 41. The diaphragm clamping means used in the seal 53 consists of a ring element generally designated by the numeral 58 which consists essentially of an annular washer type portion 59 and a plurality of integral formed and axially extending lugs 60. The radially positioned portion 59 provides the same function as the washer 45 previously described and is clamped within the shell member 57 between the outer ring portion 49 and the free marginal edge of the diaphragm 44.

FIGS. 9-11 illustrate in detail the structural features of the shell member 57 and it will be noted that the radially directed portion through which torque is transmitted and which further allows axial expansion of the seal 53 is of identical construction as that described in connection with the shell member 34 of FIGS. 3-5. FIGS. 12-14 illustrate in detail the ring element 58 used in the seal 53 to supply the diaphragm clamping function as well as to provide a seat for the forward end of the spring 54 as shown in Figs. 7 and 8. The lugs 60 formed thereon are integrally joined with the inner periphery of the washer-like portion 59 and bent in a rearwardly axial direction.

As shown in FIGS. 15-17, the ring element 58 upon assembly with the shell member 57 is received immediately inwardly of the radially extending portion 35 and the lugs 60 are received through the grooves 51 and 52. In this manner the grooves 51 and 52 provide means whereby a spring seat can be provided in association with the shell member in the area of the radially directed portion thereof without interfering with efficient torque transmission and axial expansion of the same during operation of the seal. Referring to FIGS. 7 and 8, it will be noted that the forward end of the spring 54 is seated against the lugs 60 and the spring urges the diaphragm clamping portion 59 of the ring element 58 into tight engagement with the free margin of the diaphragm 44 to fixedly clamp the same against the rear radial face of the nose portion 37. Extended operation of the seal 53 in the manner previously described results in substantial wear of the protruding sealing nose of the nose portion 37 with accompanying axial expansion of the shell member 57 in a compensating manner. With initial wear of the sealing nose, the spring 54 through the ring element 58 will axially move the nose portion 37 away from the body portion 31 to an extent that the lugs 39 of the shell member 57 engage the rear face of each groove 38 formed in the outer periphery of the nose portion 37. Continued wear of the sealing nose accompanied by the continuous urging of the spring 54 ultimately results in expansion of the shell member 57 in an axial direction towards the mating ring 27 to the extent shown in FIG. 8. With this arrangement the expansion thrust of the spring 54 is transmitted through the ring element 58, diaphragm 44 and nose portion 37 to the shell member 57.

A further modified form of seal 61 is illustrated in FIG. 18 installed within a shaft housing about a rotatable shaft 62 and resiliently urged into end face sealing engagement with a portion 63 of the shaft housing. The seal 61 is essentially formed from elements of structural design and arrangement which are similar to those previously described. Like reference numerals are used to designate similar parts and, in this connection, the body portion 31, diaphragm 44, nose portion 37, shell member 57 and ring elements 58 are structurally arranged in the same manner as described in connection with the seal 53 of FIGS. 7 and 8. The variation in design and arrangement of the seal 61 resides in the use of a coil spring 64 of only slightly greater inside diameter than the diameter of the shaft 62. The coil spring 64 is closely received about the shaft 62 and the rearmost end of the same is seated on a washer 65 which is in abutment with an enlarged portion 66 of the shaft 62. The forward end of the spring 64 is seated against a collar element generally designated by the numeral 67. This collar element is formed from an inner radially directed portion 68 which is freely received about the shaft 62 and the rear radial face of which provides the forward seat for the spring 64. The radial portion 68 of the collar element 67 has integrally joined therewith at the outer periphery thereof an axially directed annular rim or sleeve 69 which is in abutment with the outermost edges of the lugs 60 of the ring element 58. The thickness of the sleeve 69 is substantially greater than that of the lugs 60 so as to completely over-extend the same at the engaging faces thereof to provide for efficient transmission of spring strength or force to the diaphragm clamping portion 59 of the ring element 58. In all other respects the operation of the seal 61 is the same as that described in connection with the seal 53 of FIGS. 7 and 8.

FIG. 19 illustrates still a further modified seal 70 of substantially reduced axial length. A body portion 71 similar to that previously described is received about a rotatable shaft 72 and is in abutment with an enlarged portion 73 thereof. The body portion 71 is provided with a radially outwardly directed annular rim or rib 74 which is of substantial mass and which backs up and holds a spring seat collar 75 against which the rearmost end of a coil spring 76 is seated. The inner peripheral margin of the collar 75 is in abutment with the rear radial edge of a shell member 77 which is of identical structural arrangement and function as the shell member 34 described in connection with FIGS. 1 and 2. Due to the similarity of design, the structural portions of the shell member 77 are identified by the same reference numerals used in the description of the shell member 34.

The body portion 71 is provided with a flexible diaphragm 78 which is clamped by a washer 79 against the rear face of a nose portion 80 which in turn is in end face sealing engagement with a portion of a shaft housing 81 having received therein the shaft 72. The forward end of the spring 76 is seated against the radially outwardly directed rim or flange 40 of the shell member 77 and the seal 70 functions in the same manner as the seal 25 described in FIGS. 1 and 2.

In FIGS. 20 and 21 a seal 82 is illustrated which utilizes a shell member 83 in a manner whereby the shell member performs an additional function over and above those functions previously described. The shell member 83 is identical in structural design and arrangement as the shell member 57 illustrated in the FIGS. 9-10. The remaining portions of the seal 82 have also been fully described above and this seal differs basically from those previously described by reason of the elimination of a coil spring in the installation. In identifying earlier described elements with similar reference numerals, it will be noted that the seal 82 consists generally of a body portion 31, diaphragm 44, sealing nose portion 37 and washer 45. The body portion 31 is fixedly received about a rotatable shaft 84 and is in abutment at the rear face thereof with an enlarged portion 85 of the shaft 84. The protruding sealing nose of the nose portion 37 is in end face sealing engagement with a radial surface of a portion of the shaft housing 86.

The radially directed portion 35 of the shell member 83 is placed under tension upon installation of the seal 82 as shown in FIG. 20 or, in other words, is tensioned into a vertical upright position when the seal 82 is installed. With this arrangement the interconnected bands and rings of the portion 35 co-operatively function to constantly urge the sleeve 36, washer 45, free marginal portion of the diaphragm 44 and the nose portion 37 away from the body portion 31 in an axial direction towards the shaft housing 86. Upon operational wear of the protruding sealing nose of the nose portion 37, compensation in the form of axial expansion is provided by the tendency of the radially directed portion 35 of the shell member 83 to return to its position of rest which is located forwardly and in inclined relation to the vertical position assumed by this portion upon installation. Thus, the radially directed portion 35 performs the additional function of providing the resilient force necessary to cause axial expansion of the seal 82 upon operational wear to the sealing nose of the nose portion 37 and this additional function does not in any manner interfere with efficient torque transmission of the type previously described.

From the foregoing it will be readily appreciated that the use of the new and improved shell member of the present invention provides a more efficiently operating seal of the type described. There is no frictional wear between separate elements nor is there any possibility of damaging wind-up action upon initiation of torque transmission. Expanding action of the improved shell member will compensate not only for sealing wear but also for any reasonable relative axial shifting of the parts between which the seal is operatively mounted. Still further, the improved shell member is capable of providing resilient axial expansion action by reason of its adaptability of pretensioned mounting. Installation of a seal using the improved shell member is quite simple and operational life of the seal is greatly improved. As exemplified by the various embodiments of the present invention, the improved shell member is readily adapted for use in installations of various types particularly those having radial or axial space limitations.

While the use of the shell member has been illustrated and described in connection with a generally well known type of pump seal, it is not intended to limit the present invention to this particular use. It is apparent that the structural and operational principles incorporated in the shell member are readily adaptable for efficient utilization in any type of expansion seal wherein a sealing portion is arranged for axial movement relative to a fixed element forming a part of the seal.

Obviously many modifications and variations of the invention as hereinbefore set forth may be made without departing from the spirit and scope thereof, and therefore only such limitations should be imposed as are indicated in the appended claims.

I claim:

1. A seal including a body portion for mounting in fixed relation to a rotatable part, a sealing nose portion for mounting in sealing relation with a second part which is fixed relative to said first named part, and a relatively rigid intermediate portion interconnecting said body and nose portions in torque transmitting relation to said nose portion to drive the same with said body portion, said intermediate portion being in the form of a one-piece metallic shell member which is expandable in a direction axially of said seal to provide for movement of the said nose portion in an axial direction away from said body portion to compensate for frictional wear of said nose portion, said shell member having a pair of axially extending portions one of which is operatively connected to said body portion and the other of which is operatively connected to said nose portion, said axially extending portions being interconnected by an integrally formed resilient portion which is tensioned in the mounted condition of said seal and provides for axial movement between said body and nose portions.

2. A seal including a body portion for mounting in fixed relation to a rotatable part, a sealing nose portion for mounting in sealing relation with a second part which is fixed relative to said first named part, and a relatively rigid intermediate portion interconnecting said body and nose portions in torque transmitting relation to said nose portion to drive the same with said body portion, said intermediate portion being in the form of a one-piece metallic shell member which is expandable in a direction axially of said seal to provide for movement of said nose portion in an axial direction away from said body portion to compensate for frictional wear of said nose portion, said shell member having a pair of axially extending portions one of which is operatively connected to said body portion and the other of which is operatively connected to said nose portion, said axially extending portions being interconnected by an integrally formed resilient portion which is flexed into a radial plane upon mounting of said seal and in the unexpanded condition of said shell member to provide for axial movement between said body and nose portions.

3. A metallic shell for use in a seal to interconnect a pair of elements in torque transmitting relation while providing for movement of said elements away from one another in an axial direction, said shell including axially spaced and rigid tubular connecting sleeves one of which is adapted for connection with one of said elements and the other of which is adapted for connection with the other of said elements, one sleeve being of greater diameter than the other, said sleeves interconnected by an intermediate portion which is resiliently flexible by reason of being provided with a plurality of annular slot-like openings arranged to provide torque transmitting rigidity while allowing axially directed expansion movement of said sleeves, said shell when mounted in operative position having said intermediate portion tensioned into a radial plane by movement of said sleeves toward one another to provide for axial expansion of said shell.

4. A metallic shell for use in a seal to interconnect a pair of surface sealing elements in torque transmitting relation while providing for movement of said elements away from one another in an axial direction, said shell including axially spaced and rigid tubular connecting sleeves one of which is adapted for connection with one of said elements and the other of which is adapted for connection with the other of said elements, one sleeve being of greater diameter than the other, said sleeves being interconnected by an intermediate portion which is resiliently flexible by reason of being provided with a plurality of annular openings arranged to provide torque transmitting rigidity while allowing axially directed expansion movement of said sleeves, said openings being in the form of circumferentially overlapping and non-continuous arcuate slots defining inner and outer continuous ring areas formed integral with said sleeves and interconnected by a plurality of arcuate circumferentially segmental flexible bands, said shell when mounted in operative position having said intermediate portion tensioned into a radial plane by movement of said sleeves toward one another to provide for axial expansion of said shell.

5. A seal for mounting in association with a pair of relatively rotatable parts such as a shaft and a bearing plate surrounding the same for sealing action therebetween, said seal including a resilient body portion for fixed mounting on said shaft, a sealing nose portion for mounting about said shaft in spaced relation thereto for end face sealing engagement with a radial face of said bearing plate, and an interconnecting shell member intermediate said body and nose portions, said shell member including axially spaced sleeves, one of which is connected with said body portion and the other of which is associated with said nose portion, said sleeves being radially offset relative to one another and being interconnected by an intermediate radially directed portion which is flexible by reason of being provided with a plurality of annular slot-like openings arranged to provide torque transmitting rigidity while allowing axially directed expansion movement of said sleeves, said nose portion being axially movable relative to the sleeve associated therewith while being engaged by said sleeve to prevent relative rotation therebetween, said body portion having an integral flexible lip-like diaphragm sealing the area between said body and nose portions with its free margin held in tight association with said nose portion by diaphragm clamping means received within such shell member and held therein by said radially directed portion, and expanding spring means received about said seal for fixed seating at one end relative to said shaft and at the other end in urging relation with the portion of said shell member associated with said nose portion to expand said seal.

6. A seal for mounting in association with a pair of relatively rotatable parts such as a shaft and a bearing plate surrounding the same for sealing action therebetween, said seal including a resilient body portion for fixed mounting on said shaft, a sealing nose portion for mounting about said shaft in spaced relation thereto for end face sealing engagement with a radial face of said bearing plate, and an interconnecting shell member intermediate said body and nose portions, said shell member including axially spaced sleeves one of which is connected with said body portion and the other of which is associated with said nose portion, said sleeves being radially offset relative to one another and being interconnected with an intermediate radially directed portion which is flexible by reason of being provided with a plurality of annular slot-like openings arranged to provide torque transmitting rigidity while allowing axially directed expansion movement of said sleeves, said nose portion being axially movable relative to the sleeve associated therewith while being engaged by said sleeve to prevent relative rotation therebetween, said body portion having an integral flexible lip-like diaphragm sealing the area between said body and nose portions with its free margin held in tight association with said nose portion by diaphragm clamping means received within said shell member and held therein by said radially directed portion, and expanding spring means received about said seal for fixed seating at one end relative to said shaft, said diaphragm clamping means including axially directed lugs extending through the openings of the radially directed portion of said shell member by means of which the other end of said spring means is in urging relation with the portion of said shell member associated with said nose portion to expand said seal.

7. A seal for mounting in association with a pair of relatively rotatable parts such as a shaft and a bearing plate surrounding the same for sealing action therebetween, said seal including a resilient body portion for fixed mounting on said shaft, a sealing nose portion for mounting about said shaft in spaced relation thereto for end face sealing engagement with a radial face of said bearing plate, and an interconnecting shell member intermediate said body and nose portions, said shell member including axially spaced sleeves one of which is connected with said body portion and the other of which is associated with said nose portion, said sleeves being radially offset relative to one another and being interconnected with an intermediate portion which is resiliently flexible by reason of being provided with a plurality of annular slot-like openings arranged to provide torque transmitting rigidity while allowing axially directed expansion movement of said sleeves, in the mounted condition of said seal said intermediate portion being tensioned into a radial plane by movement of said sleeves toward one another to provide for axial expansion of said shell, said nose portion being axially movable relative to the sleeve associated therewith while being engaged by said sleeve to prevent relative rotation therebetween, said body portion having an integral flexible lip-like diaphragm sealing the area between said body and nose portions with its free margin held in tight association with said nose portion by diaphragm clamping means received within said shell member and held therein by said intermediate portion.

8. A seal for mounting in association with a pair of relatively rotatable parts such as a shaft and a bearing plate surrounding the same for sealing action therebetween, said seal including a resilient body portion for fixed mounting on said shaft, a sealing nose portion for mounting about said shaft in spaced relation thereto for end face sealing engagement with a radial face of said bearing plate, and an interconnecting shell member intermediate said body and nose portions, said shell member including axially spaced sleeves one of which is connected with said body portion and the other of which is associated with said nose portion, said sleeves being radially offset relative to one another and being interconnected by an intermediate radially directed portion which is flexible by reason of being provided with a plurality of annular openings arranged to provide torque transmitting rigidity while allowing axially directed expansion movement of said sleeves, said openings being in the form of circumferentially overlapping and non-continuous arcuate slots defining inner and outer continuous ring areas formed integral with said sleeves and interconnected with a plurality of arcuate circumferentially segmental flexible bands, said nose portion being axially movable relative to the sleeve associated therewith while being engaged by said sleeve to prevent relative rotation therebetween, said body portion having an integral flexible lip-like diaphragm sealing the area between the body and nose portions with its free margin held in tight association with said nose portion by diaphragm clamping means received within said shell member and held therein by said radially directed portion, and expanding spring means received about said seal for fixed seating at one end relative to said shaft and at the other end in urging relation with the portion of said shell member associated with said nose portion to expand said seal.

References Cited in the file of this patent

UNITED STATES PATENTS

| | | |
|---|---|---|
| 2,290,813 | Ploeger | July 21, 1942 |
| 2,360,372 | Snyder | Oct. 17, 1944 |
| 2,375,985 | Freeman | May 15, 1945 |
| 2,382,960 | Compton | Aug. 21, 1945 |
| 2,489,545 | Storer | Nov. 29, 1949 |
| 2,559,963 | Jensen | July 10, 1951 |
| 2,607,615 | Katcher | Aug. 19, 1952 |
| 2,752,176 | Ayling | June 26, 1956 |

FOREIGN PATENTS

| | | |
|---|---|---|
| 648,847 | Great Britain | Jan. 10, 1951 |
| 752,266 | Great Britain | July 11, 1956 |
| 891,040 | Germany | Sept. 24, 1953 |